US012544202B2

(12) United States Patent
Lee

(10) Patent No.: US 12,544,202 B2
(45) Date of Patent: Feb. 10, 2026

(54) ORAL IMAGE PROCESSING DEVICE AND ORAL IMAGE PROCESSING METHOD

(71) Applicant: MEDIT CORP., Seoul (KR)

(72) Inventor: Sung Hoon Lee, Seoul (KR)

(73) Assignee: MEDIT CORP., Seoul (KR)

( * ) Notice: Subject to any disclaimer, the term of this patent is extended or adjusted under 35 U.S.C. 154(b) by 205 days.

(21) Appl. No.: 18/033,695

(22) PCT Filed: Sep. 30, 2021

(86) PCT No.: PCT/KR2021/013459
§ 371 (c)(1),
(2) Date: Apr. 25, 2023

(87) PCT Pub. No.: WO2022/092594
PCT Pub. Date: May 5, 2022

(65) Prior Publication Data
US 2023/0390035 A1 Dec. 7, 2023

(30) Foreign Application Priority Data

Oct. 28, 2020 (KR) .................. 10-2020-0141576
Nov. 11, 2020 (KR) .................. 10-2020-0150519

(51) Int. Cl.
*A61C 13/34* (2006.01)
*A61C 9/00* (2006.01)
(Continued)

(52) U.S. Cl.
CPC ............ *A61C 13/34* (2013.01); *A61C 9/0053* (2013.01); *G06T 7/11* (2017.01); *G06T 7/344* (2017.01);
(Continued)

(58) Field of Classification Search
CPC ...... A61C 13/34; A61C 9/0053; A61C 9/0046; G06T 7/11; G06T 7/344; G06T 15/06;
(Continued)

(56) References Cited

U.S. PATENT DOCUMENTS 11,455,774 B2   9/2022  Claessen et al.
2004/0015327 A1* 1/2004  Sachdeva .......... A61C 7/00
                                              702/167

(Continued)

FOREIGN PATENT DOCUMENTS

JP   2009-544417 A   12/2009
JP   2020-006082 A    1/2020
(Continued)

OTHER PUBLICATIONS

Korean Office Action dated Jul. 17, 2023 in Korean Application No. 10-2020-0150519.
(Continued)

*Primary Examiner* — Xiao M Wu
*Assistant Examiner* — Latrell Anthony Creary
(74) *Attorney, Agent, or Firm* — Sughrue Mion, PLLC

(57) ABSTRACT

Embodiments of the disclosure relate to an intraoral image processing method and an intraoral image processing apparatus, and the intraoral image processing method according to an embodiment may include obtaining an intraoral image by scanning an object including one or more teeth, generating a first tooth image from the intraoral image, generating, based on the first tooth image and tooth model data, a second tooth image including roots of the teeth, and displaying the second tooth image.

18 Claims, 11 Drawing Sheets

(51) Int. Cl.
*G06T 7/11* (2017.01)
*G06T 7/33* (2017.01)
*G06T 15/06* (2011.01)
*G06T 19/20* (2011.01)

(52) U.S. Cl.
CPC .............. *G06T 15/06* (2013.01); *G06T 19/20* (2013.01); *G06T 2207/30036* (2013.01); *G06T 2210/21* (2013.01); *G06T 2210/41* (2013.01); *G06T 2219/2004* (2013.01); *G06T 2219/2016* (2013.01)

(58) Field of Classification Search
CPC ........... G06T 19/20; G06T 2207/30036; G06T 2210/21; G06T 2210/41; G06T 2219/2004; G06T 2219/2016; G06T 7/50; G06T 2207/10028; G06T 2219/2021; G06T 11/00; G16H 50/50; G16H 30/20; G16H 30/40; A61B 1/24; A61B 5/00
See application file for complete search history.

(56) References Cited

U.S. PATENT DOCUMENTS

| | | |
|---|---|---|
| 2008/0026338 A1 | 1/2008 | Cinader |
| 2011/0159451 A1* | 6/2011 | Kuo ....................... G16H 50/50 |
| | | 433/24 |
| 2012/0308963 A1* | 12/2012 | Hasselgren ............ A61C 13/20 |
| | | 700/98 |
| 2016/0374784 A1 | 12/2016 | Joshi |
| 2019/0259220 A1* | 8/2019 | Lancelle ................. G06T 15/50 |
| 2021/0030378 A1 | 2/2021 | Heo et al. |
| 2022/0160469 A1* | 5/2022 | Cunliffe ................. G16H 20/40 |

FOREIGN PATENT DOCUMENTS

| | | |
|---|---|---|
| KR | 10-1474098 B1 | 12/2014 |
| KR | 10-2017-0000794 A | 1/2017 |
| KR | 10-2067614 B1 | 1/2020 |
| KR | 10-2020-0108851 A | 9/2020 |
| WO | 2016003257 A2 | 1/2016 |

OTHER PUBLICATIONS

International Search Report for PCT/KR2021/013459 dated Jan. 12, 2022.

* cited by examiner

ORAL IMAGE PROCESSING DEVICE AND ORAL IMAGE PROCESSING METHOD

This Application is a National Stage of International Application No. PCT/KR2021/013459 filed Sep. 30, 2021, claiming priority based on Korean Patent Application No. 10-2020-0141576 filed on Oct. 28, 2020 and Korean Patent Application No. 10-2020-0150519 filed on Nov. 11, 2020.

TECHNICAL FIELD

Embodiments of the disclosure relate to an intraoral image processing apparatus and an intraoral image processing method, and more particularly, to an intraoral image processing apparatus and method for generating an intraoral image including the root of a tooth (a tooth root).

BACKGROUND ART

Recently, as a method of obtaining information about a patient's oral cavity, a method of obtaining an intraoral image by inserting an intraoral scanner into the patient's oral cavity has been used. Three-dimensional (3D) data regarding an object such as a patient's teeth, gums, jawbone, etc. may be obtained by scanning the patient's oral cavity with an intraoral scanner, and the obtained 3D data may be used for treatment of a tooth, orthodontic treatment, or the like.

The intraoral scanner obtains 3D surface data, but cannot obtain data regarding the root of a tooth (a tooth root). Therefore, when a tooth region and a gingival region are segmented from an intraoral image, a tooth image not including the root of a tooth is obtained. When a tooth movement or orthodontic treatment simulation is performed based on the tooth image not including the root of the tooth, a problem may occur in that results for an unnatural simulation may be provided.

DISCLOSURE

Technical Problem

Embodiments of the disclosure provide an intraoral image processing apparatus and an intraoral image processing method capable of generating an intraoral image including not only the head of a tooth (tooth crown) but also the root of the tooth (tooth root) by generating data regarding the tooth root.

Technical Solution

An intraoral image processing method according to an embodiment may include obtaining an intraoral image by scanning an object including one or more teeth, generating a first tooth image from the intraoral image, generating, based on the first tooth image and tooth model data, a second tooth image including roots of teeth, and displaying the second tooth image.

According to an embodiment, the generating of the first tooth image may include segmenting a tooth region and a gingival region from the intraoral image.

According to an embodiment, the generating of the first tooth image may further include segmenting the teeth included in the tooth region.

According to an embodiment, the generating of the second tooth image may include aligning the first tooth image with the tooth model data and synthesizing the first tooth image and the tooth model data.

According to an embodiment, the aligning of the first tooth image with the tooth model data may include aligning the teeth included in the first tooth image with teeth included in the tooth model data, based on shape information on the teeth included in the first tooth image and shape information on the teeth included in the tooth model data.

According to an embodiment, the synthesizing of the first tooth image and the tooth model data may include generating a synthetic image by performing a synthesis test.

According to an embodiment, the synthesis test may be a nearest neighbor test or a ray intersection test.

According to an embodiment, when the synthesis test is the nearest neighbor test, the generating of the synthetic image may include finding a vertex in the first tooth image, which is closest to a vertex in the tooth model data, determining data of the first tooth image as data of the synthetic image when a distance between the vertex in the tooth model data and the vertex in the first tooth image, which is closest to the vertex in the tooth model data, is less than or equal to a threshold distance, and determining the vertex in the tooth model data as data of the synthetic image when the distance between the vertex in the tooth model data and the vertex in the first tooth image, which is closest to the vertex in the tooth model data, is greater than the threshold distance.

According to an embodiment, when the synthesis test is the ray intersection test, the generating of the synthetic image may include testing whether a virtual ray intersects the first tooth image, wherein the virtual ray is generated at a first vertex among a plurality of vertices included in the tooth model data and has a direction parallel to a normal vector at the first vertex, determining data of the first tooth image at a point of the intersection as data of the synthetic image when the virtual ray intersects the first tooth image, and determining data for the first vertex as data of the synthetic image when the virtual ray does not intersect the first tooth image.

According to an embodiment, the intraoral image processing method may further include deleting at least one of a portion of the first tooth image and a portion of the tooth model data from a boundary region between the first tooth image and the tooth model data, which is included in the synthetic image.

According to an embodiment, the intraoral image processing method may further include scaling the tooth model data included in the synthetic image.

According to an embodiment, the intraoral image processing method may further include performing surface blending for a gap region included in the synthetic image.

According to an embodiment, the second tooth image may include a crown and a root of the one or more teeth, and the generating of the second tooth image may include generating an image of the crown based on intraoral data obtained through the scanning and generating an image of the root based on the tooth model data.

An intraoral image processing apparatus according to an embodiment may include a display, a memory storing one or more instructions, and a processor configured to execute the one or more instructions stored in the memory to obtain an intraoral image by scanning an object including one or more teeth, generate a first tooth image from the intraoral image, generate, based on the first tooth image and tooth model data, a second tooth image including roots of the teeth, and controlling the display to display the second tooth image.

Advantageous Effects

An intraoral image processing apparatus and an intraoral image processing method according to embodiments of the disclosure are capable of generating a tooth image including the roots of teeth when generating a tooth image by segmenting the teeth from an intraoral image. Accordingly, a natural tooth image or simulation based on the natural tooth image may be provided.

DESCRIPTION OF DRAWINGS

The present disclosure will be easily understood from the following description taken in conjunction with the accompanying drawings in which reference numerals denote structural elements.

MODE FOR INVENTION

Figure 1:
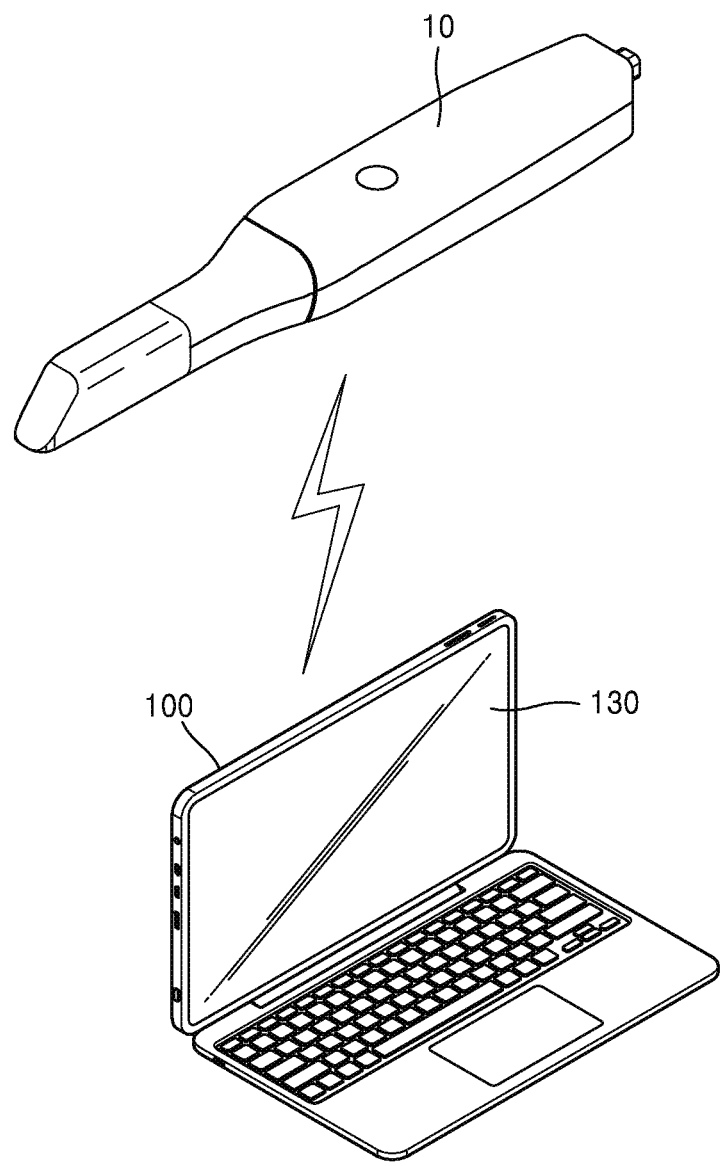
FIG. 1 is a diagram for describing an intraoral image processing system according to an embodiment.

The present specification describes principles of the present disclosure and sets forth embodiments thereof to clarify the scope of the present disclosure and to allow one of ordinary skill in the art to implement the present disclosure. The embodiments of the disclosure may be implemented in various forms.

Like reference numerals denote like elements throughout. The present specification does not describe all components in the embodiments, and common knowledge in the art or the same descriptions of the embodiments will be omitted below. Terms such as 'part' and 'portion' used herein denote those that may be embodied using software or hardware, and according to embodiments, a plurality of 'parts' or 'portions' may be embodied as a single unit or element, or a single 'part' or 'portion' may include a plurality of units or elements. Hereinafter, the operating principles and embodiments of the present disclosure will be described in detail with reference to the accompanying drawings.

In the present specification, an image may include an image showing at least one tooth or an oral cavity including the at least one tooth (hereinafter, referred to as an 'intraoral image').

Also, in the present specification, an image may be a two-dimensional (2D) image of an object or a three-dimensional (3D) model or 3D image representing the object in 3D. Furthermore, in this specification, the image may refer to data required to represent an object in 2D or 3D, such as raw data or the like obtained from at least one image sensor. Specifically, the raw data is data obtained to generate an intraoral image, and may be data (e.g., 2D data) obtained from at least one image sensor included in an intraoral scanner when scanning the inside of a patient's oral cavity, which is an object, by using the intraoral scanner. Alternatively, the raw data may be data obtained from at least one image sensor included in a dental table scanner when scanning a plaster model or the like with the dental table scanner. However, the raw data is not limited thereto.

In the present specification, an 'object' may include teeth, gingivae, at least a portion of an oral cavity, artificial structures insertable into the oral cavity (e.g., an orthodontic appliance, an implant, artificial teeth, orthodontic auxiliary devices inserted into the oral cavity, etc.), plaster models, impression models, etc. In this case, the orthodontic appliance may include at least one of a bracket, an attachment, an orthodontic screw, a lingual orthodontic appliance, and a removable orthodontic retainer.

Hereinafter, embodiments are described in detail with reference to the drawings.

FIG. 1 is a diagram for describing an intraoral image processing system according to an embodiment.

Referring to FIG. 1, an intraoral image processing system according to an embodiment includes an intraoral scanner 10 and an intraoral image processing apparatus 100.

According to an embodiment, the intraoral scanner 10 is a medical device for obtaining an intraoral image. Specifically, the intraoral scanner 10 may be a device for obtaining an image of an oral cavity including at least one tooth by being inserted into the oral cavity and scanning teeth in a non-contact manner.

In addition, the intraoral scanner 10 may have a shape that allows insertion in and withdrawal from the oral cavity, and scans the inside of a patient's oral cavity by using at least one image sensor (e.g., an optical camera, etc.). The intraoral scanner 10 may obtain information about a surface of an object as raw data in order to image the surface of the object, i.e., the surface of at least one of teeth and gingiva in the oral cavity and artificial structures insertable into the oral cavity (e.g., an orthodontic appliance including brackets, wires, etc., an implant, artificial teeth, orthodontic auxiliary devices inserted into the oral cavity, etc.).

The image data obtained by the intraoral scanner 10 may be transmitted to the intraoral image processing apparatus 100 connected via a wired or wireless communication network.

The intraoral image processing apparatus 100 may be any electronic device that is connected to the intraoral scanner 10 through a wired or wireless communication network and be capable of receiving a 2D image obtained by scanning the oral cavity from the intraoral scanner 10, generating an intraoral image based on the received 2D image, and processing, displaying, and/or transmitting the intraoral image.

The intraoral image processing apparatus 100 may generate, based on 2D image data received from the intraoral scanner 10, information or an intraoral image by processing the 2D image data. In addition, the intraoral image processing apparatus 100 may display the generated information and intraoral image on a display 130.

The intraoral image processing apparatus 100 may be a computing device such as a smartphone, a laptop computer, a desktop computer, a personal digital assistant (PDA), and a tablet PC, but is not limited thereto.

Furthermore, the intraoral image processing apparatus 100 may exist in the form of a server (or a server apparatus) for processing an intraoral image.

In addition, the intraoral scanner 10 may transmit raw data obtained through intraoral scanning to the intraoral image processing apparatus 100 before the raw data is processed. In this case, the intraoral image processing apparatus 100 may generate, based on the received raw data, a 3D intraoral image representing the oral cavity in a 3D manner. According to an embodiment, the intraoral image processing apparatus 100 may generate, based on the received raw data, 3D data (e.g., surface data) representing a shape of the surface of the object in 3D.

According to an embodiment, 3D surface data may be in the form of mesh data. For example, mesh data is a combination of a plurality of polygons (faces), and a polygon refers to a geometric shape formed by a plurality of vertices. In this case, the polygon may be a polygon such as a triangle or a quadrilateral, and depending on the shape of the polygon, the mesh data may be represented as a triangular mesh, a quadrilateral mesh, or a polygon mesh.

A '3D intraoral image' according to an embodiment may be generated by modeling an internal structure of the oral cavity in 3D based on the received raw data, and thus may also be referred to as a '3D oral cavity model' or a '3D oral cavity image'. Hereinafter, a model or image representing the oral cavity in 2D or 3D will be collectively referred to as an 'intraoral image'.

In addition, the intraoral image processing apparatus 100 may analyze, process, and display the generated intraoral image, and/or transmit the generated intraoral image to the display and/or an external device.

In another example, the intraoral scanner 10 may obtain raw data through intraoral scanning and process the obtained raw data to generate an image corresponding to the oral cavity that is an object. In addition, the intraoral scanner 10 may transmit the generated image to the intraoral image processing apparatus 100. In this case, the intraoral image processing apparatus 100 may analyze, process, display, and/or transmit the received image.

In an embodiment of the disclosure, the intraoral image processing apparatus 100 is an electronic device capable of generating and displaying an intraoral image representing an oral cavity including one or more teeth in 3D, and is described in detail below.

Figure 2:
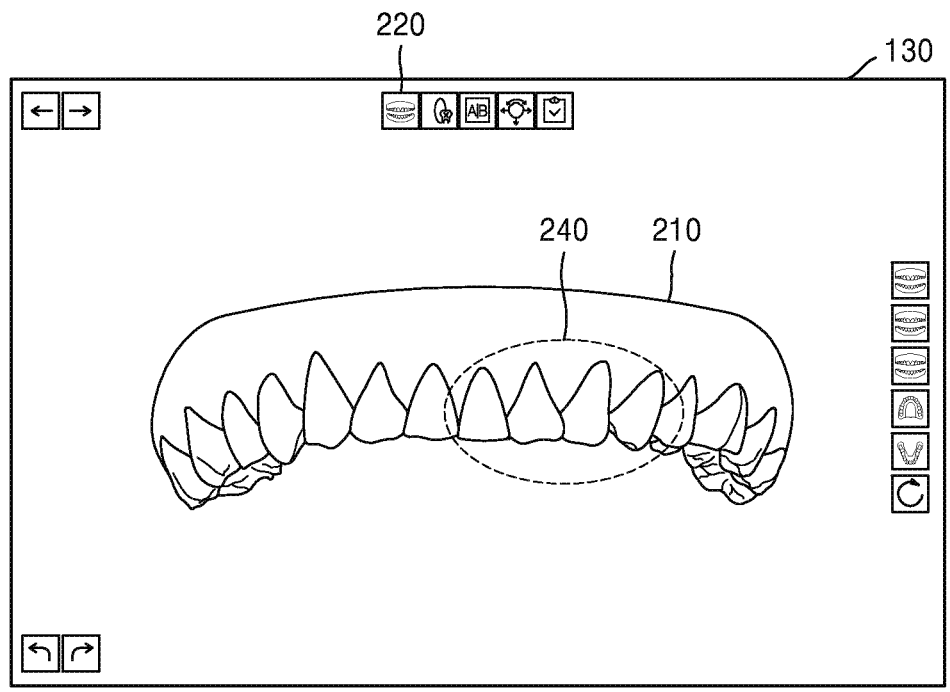
FIG. 2 is a reference diagram for describing an operation of generating a first tooth image, according to an embodiment.
Figure 2:
Figure 2:
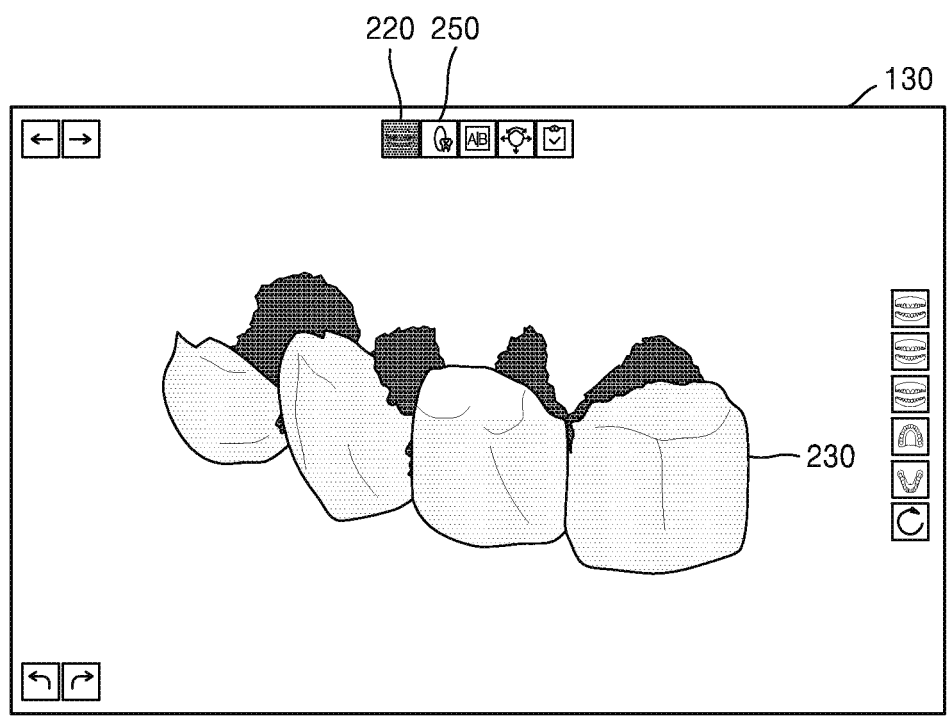

FIG. 2 is a reference diagram for describing an operation of generating a first tooth image, according to an embodiment.

Referring to FIG. 2, according to an embodiment, the intraoral image processing apparatus 100 may obtain 3D intraoral data. For example, the 3D intraoral data may be obtained by scanning at least one tooth with the intraoral scanner 10 described with reference to FIG. 1. In this case, not only the tooth and the gingiva adjacent to the tooth may be scanned.

According to an embodiment, the 3D intraoral data may be mesh data, or data representing surface information of an object (3D surface data).

According to an embodiment, the intraoral image processing apparatus 100 may generate an intraoral image 210 based on the obtained 3D intraoral data. According to an embodiment, as shown in FIG. 2, the intraoral image processing apparatus 100 may visually output the intraoral image 210 onto a user interface screen. The user interface screen may be a screen of the display 130 of FIG. 1. The user interface screen may include at least one menu for allowing a user (e.g., a dentist, etc.) to use data obtained by scanning teeth with the intraoral scanner 10.

According to an embodiment, the intraoral image processing apparatus 100 may generate a first tooth image 230 by automatically or manually segmenting a tooth region and a gingival region from the intraoral image 210. Segmenting the tooth region and the gingival region in the intraoral image 210 may mean separating teeth included in the intraoral image from the gingival region.

According to an embodiment, the intraoral image processing apparatus 100 may segment the intraoral image 210 into a tooth region and a gingival region by using artificial intelligence (AI) without a user's input.

According to another embodiment, the intraoral image processing apparatus 100 may perform segmentation based on a user input. In detail, the intraoral image processing apparatus 100 may display, on the user interface screen, both the intraoral image 210 and menus for editing or changing the intraoral image. When receiving a user input for selecting a segmentation menu 220 from among displayed at least one menu, the intraoral image processing apparatus 100 may segment the tooth region and the gingival region in the intraoral image 210.

Furthermore, the segmentation for generating the first tooth image 230 may also mean separating the tooth region from the gingival region and then separating the teeth included in the tooth region into individual teeth.

The segmentation according to the user input may be performed by performing segmentation into individual teeth according to curvature distribution of the tooth region and the gingival region and/or curvature distribution of teeth included in the tooth region.

In addition, based on a user's input for selecting some teeth 240 from among the teeth included in the intraoral image, the intraoral image processing apparatus 100 may perform segmentation only on the selected teeth 240. However, the present disclosure is not limited thereto.

The intraoral image processing apparatus 100 may visually output the first tooth image 230 via the user interface screen.

According to an embodiment, the intraoral scanner 10 obtains data regarding an object by scanning a surface of the object, and cannot obtain data regarding roots of teeth (tooth roots) covered by gingiva. Accordingly, when a tooth is segmented from an intraoral image, the segmented tooth is an open tooth without a tooth root, and when a tooth movement or orthodontic treatment simulation is performed based on an image not including a tooth root, a problem may occur in that results for an unnatural simulation may be provided.

Therefore, according to an embodiment, to provide a natural tooth image or simulation, the intraoral image processing apparatus 100 may generate a tooth image (hereinafter, referred to as a second tooth image) including roots of teeth.

FIGS. 3 to 8 are reference diagrams for describing an operation in which an intraoral image processing system generates a second tooth image including roots of teeth, according to an embodiment.

Figure 3:
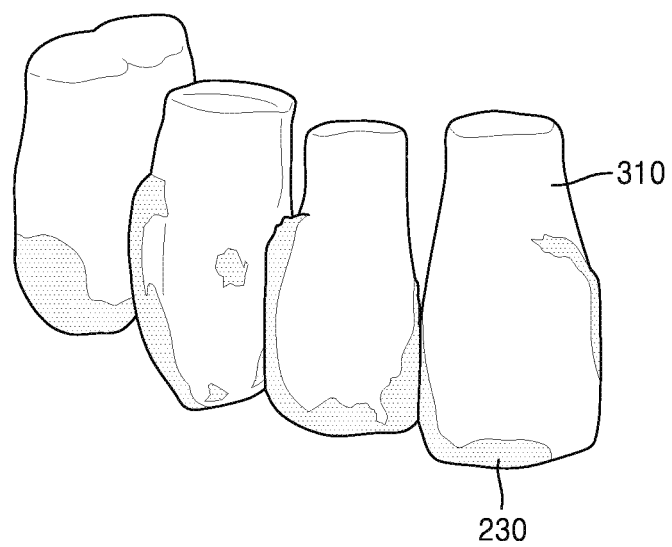
FIGS. 3 to 8 are reference diagrams for describing an operation in which an intraoral image processing system generates a second tooth image including a root of a tooth, according to an embodiment.

FIG. 3 is a reference diagram for describing an operation of aligning the first tooth image of FIG. 2 with tooth model data.

Referring to FIG. 3, according to an embodiment, the intraoral image processing apparatus 100 may align the first tooth image 230 of FIG. 2 with tooth model data 310. The tooth model data 310 is template model data in which teeth have ideal shapes and are arranged in ideal positions.

According to an embodiment, the intraoral image processing apparatus 100 may store a plurality of pieces of tooth model data in a memory, and may determine tooth model data similar to the first tooth image 230 from among the plurality of pieces of tooth model data. In this case, the intraoral image processing apparatus 100 may determine tooth model data that is most similar to the first tooth image 230, based on shape information on the teeth included in the first tooth image 230 and shape information on teeth included in the plurality on pieces of tooth model data. Furthermore, the intraoral image processing apparatus 100 may determine tooth model data that is most similar to the first tooth image 230, based on shape information on a dental arch included in the first tooth image 230, size information on the teeth therein, shape information on dental arches included in the plurality of pieces of tooth model data, size information on the teeth therein, etc. However, the present disclosure is not limited thereto.

The intraoral image processing apparatus 100 may align the first tooth image 230 with the tooth model data 310, based on the shape information on the dental arch included in the first tooth image 230, the size information on the teeth therein, the shape information on the dental arches included in the plurality of pieces of tooth model data, the size information on the teeth therein, etc.

When the intraoral image processing apparatus 100 aligns the first tooth image 230 with the tooth model data 310, various alignment algorithms such as the known iterative closest point (ICP) algorithm may be used. The ICP is an algorithm for minimizing a distance between two point clouds, and is used to reconstruct 2D or 3D surfaces from different scan data. The ICP algorithm keeps a point cloud called a reference fixed while transforming a point cloud called a source to best match the reference. The ICP algorithm may align 3D models by iteratively refining the transformation (a combination of translation and rotation) required to minimize an error metric representing a distance from the source to the reference. Various algorithms as well as ICP may be used as an alignment algorithm, and for example, the Kabsch algorithm may be used.

When the intraoral image processing apparatus 100 uses the ICP algorithm when aligning the first tooth image 230 with the tooth model data 310, a point cloud corresponding to the first tooth image 230 serves as a reference, and a point cloud corresponding to the tooth model data 310 may serve as a source. However, the present disclosure is not limited thereto.

When the first tooth image 230 is aligned with the tooth model data 310, the intraoral image processing apparatus 100 may synthesize the first tooth image 230 and the tooth model data 310 by performing a synthesis test.

The synthesis test may be a nearest neighbor test or a ray intersection test.

For example, the intraoral image processing apparatus 100 may generate a synthetic image by performing a nearest neighbor test. Specifically, the nearest neighbor test refers to a method of finding a vertex in the first tooth image 230, which is closest to a vertex in the tooth model data 310, and checking a distance between the vertex in the tooth model data 310 and its closest vertex in the first tooth image 230. When the distance is less than or equal to a specific threshold distance, the vertex in the tooth model data 310 may be deleted, and when the distance exceeds the specific threshold distance, the synthetic image 430 may be generated using the tooth model data 310.

The specific threshold distance may be greater than or equal to 1 mm but less than or equal to 3 mm (e.g., 2 mm) without being limited thereto, and the threshold distance may have various other ranges.

The nearest neighbor test may use one or more types of structures selected from among K-d tree, Octree, and R-tree, but is not limited thereto.

In addition, the nearest neighbor test may be quickly performed after decomposing a space by using spatial search algorithms, but is not limited thereto and various other algorithms may be used.

Figure 4:
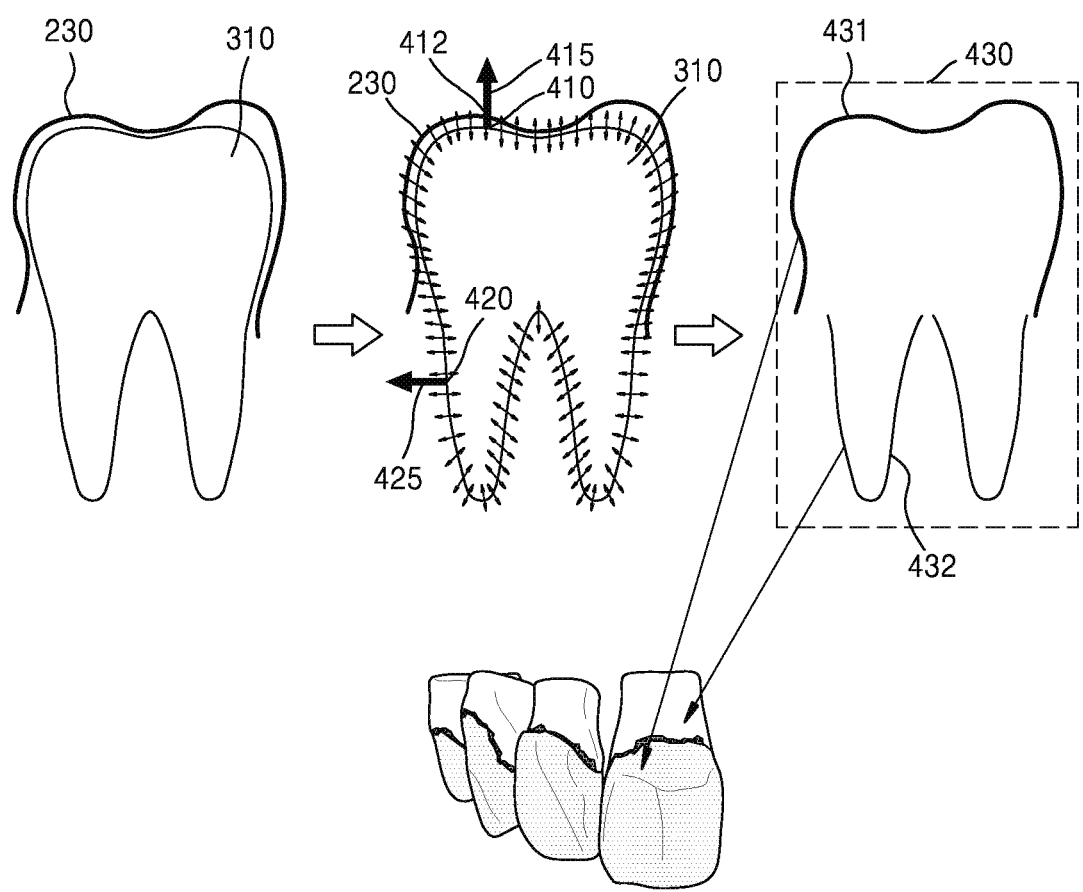

Hereinafter, an operation of synthesizing the first tooth image 230 and the tooth model data 310 by performing a ray intersection test is described in detail with reference to FIG. 4.

For example, the intraoral image processing apparatus 100 may perform a ray intersection test and delete the tooth model data 310 from a region where the first tooth image 230 and the tooth model data 310 overlap to thereby generate a synthetic image. Referring to FIG. 4, the ray intersection test refers to a method of generating, at a plurality of vertices included in the tooth model data 310, virtual rays parallel to normal vectors at the plurality of vertices at a certain distance in both directions and then checking whether the virtual rays intersect data in the first tooth image 230. The intraoral image processing apparatus 100 may generate a synthetic image based on a result of the ray intersection test.

In this case, the certain distance may be greater than or equal to 1 mm but less than or equal to 3 mm (e.g., 2 mm) in both directions without being limited thereto, and may have various ranges of values. Also, the certain distance may be determined according to a position where a virtual ray is generated. Although FIG. 4 shows a case where the tooth model data 310 is located inward of the first tooth image 230, tooth model data according to an embodiment may be located outward or inward of a first tooth image, and thus the intraoral image processing apparatus 100 may generate a vertical ray in both directions to perform a ray intersection test.

For example, when a virtual ray 415 generated at a first vertex 410 among the plurality of vertices included in the tooth model data 310 in a direction parallel to a normal vector at the first vertex 410 intersects data of the first tooth image 230, the intraoral image processing apparatus 100 may determine the data of the first tooth image 230 at an intersection point 412 as data of the synthetic image 430.

On the other hand, when a virtual ray 425 generated at a second vertex 420 among the plurality of vertices included in the tooth model data 310 in a direction parallel to a normal vector at the second vertex 420 does not intersect data of the first tooth image 230, the intraoral image processing apparatus 100 may determine data for the second vertex 420 as data of the synthetic image 430.

The intraoral image processing apparatus 100 performs a ray intersection test for the plurality of vertices included in the tooth model data in the manner described above, and when the vertices intersect the first tooth image 230 as a result of the ray intersection test, the intraoral image processing apparatus 100 may delete each of the vertices in the tooth model data 310 and adjacent faces of the vertex, or when they do not intersect the first tooth image 230, generate the synthetic image 430 by using the tooth model data 310. For example, adjacent faces may include one or more faces that share a vertex at which a virtual ray is generated.

A first region 431 of the synthetic image 430 represents data obtained from the first tooth image, and a second region 432 represents data obtained from the tooth model data 310.

According to an embodiment, when the intraoral image processing apparatus 100 performs a ray intersection test by using the first tooth image 230 segmented into only a tooth region and a gingival region, a virtual ray generated in both directions from a root of a first tooth included in the tooth model data 310 may intersect scan data regarding a second tooth adjacent to the first tooth (data regarding the second tooth included in the first tooth image 230). In this case, a problem occurs in that data regarding the root of the first tooth included in the tooth model data 310 may be deleted.

To prevent the above-described problem, according to an embodiment, the intraoral image processing apparatus 100 generates a virtual ray having a certain distance, and accordingly a virtual ray generated at the root of the first tooth does not intersect scan data regarding the second tooth adjacent to the first tooth.

Furthermore, according to an embodiment, the intraoral image processing apparatus 100 may segment teeth included in the first tooth image 230 into individual teeth, and respectively align the individual teeth to teeth included in the tooth model data. In this case, the intraoral image processing apparatus 100 may sequentially perform ray intersection tests for each of the individual teeth. For example, the intraoral image processing apparatus 10 may perform a ray intersection test on scan data (the first tooth image) regarding the first tooth among one or more teeth and tooth model data, and perform a ray intersection test on scan data (the first tooth image) regarding the second tooth and the tooth model data. In this way, when a ray intersection test is performed individually for each of the teeth, the problem of deletion of tooth model data regarding the root of the first tooth does not occur due to the intersection of a virtual ray generated at the root of the first tooth with the scan data (the first tooth image) regarding the second tooth.

Figure 5:
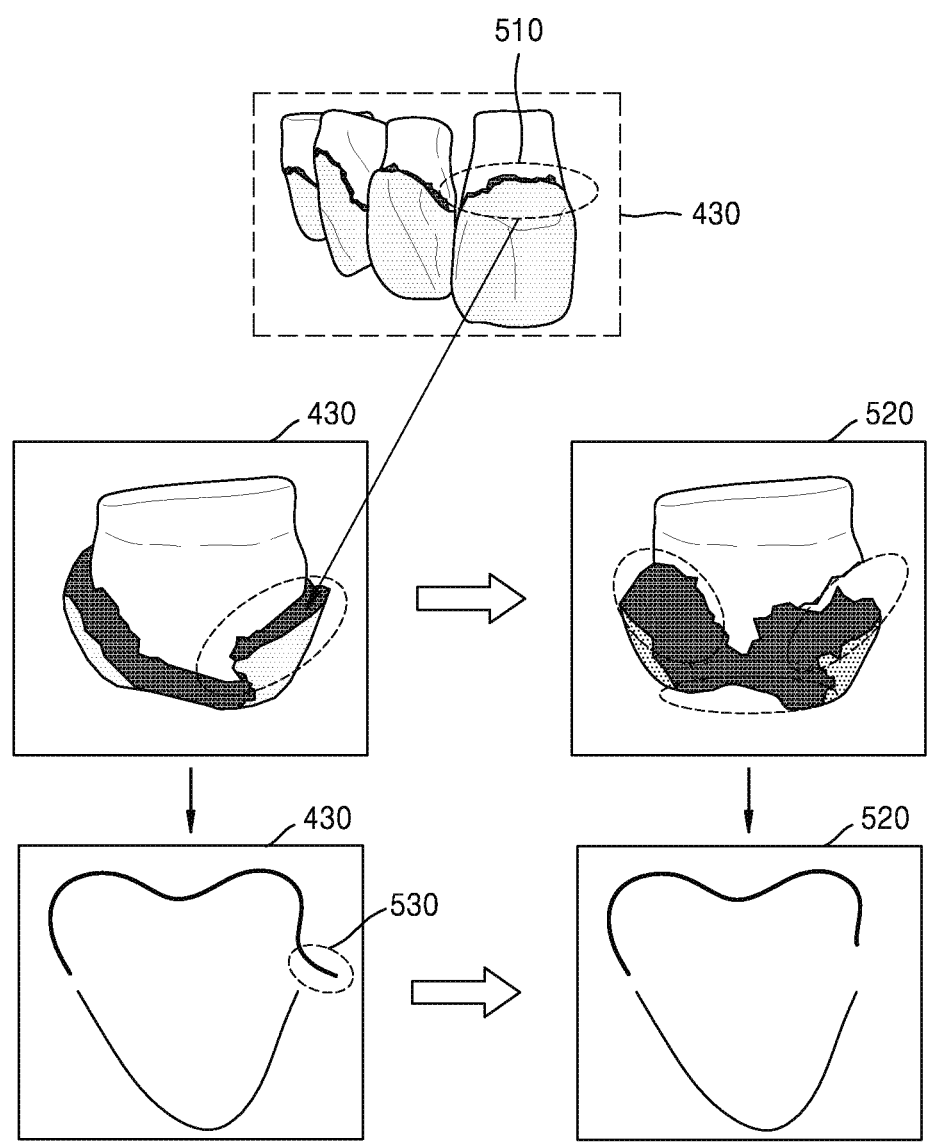

Moreover, referring to FIG. 5, the synthetic image 430 may include a boundary region 510 between first tooth image data and tooth model data, and the intraoral image processing apparatus 100 may perform boundary shrinking for smooth surface blending between the first tooth image data and the tooth model data. The boundary shrinking may be an operation of deleting (shrinking) a mesh shape of at least one a portion of data of the first tooth image or a portion of the tooth model data located in the boundary region 510 of the synthetic image 430. For example, the intraoral image processing apparatus 100 may delete a combination of polygons of a certain size from mesh data included in the first tooth image data.

As shown in FIG. 5, the intraoral image processing apparatus 100 may perform the boundary shrinking to remove a pointed region 530 or the like included in the boundary region of the synthetic image 430.

Furthermore, because the tooth model data and the first tooth image do not intersect due to a scan hole present in the first tooth image during the ray intersection test by the intraoral image processing apparatus 100 according to an embodiment, the tooth model data may not be deleted from a portion where the first tooth image should actually be used but remain as a small cluster in the synthetic image. The small cluster may mean a small chunk of data spaced apart (separated) from chunks of data (first tooth image data or tooth model data) included in the synthetic image. For example, the small cluster may refer to a chunk of data having a size less than or equal to a preset threshold value, but is not limited thereto. The intraoral image processing apparatus 100 may remove a small cluster from the synthetic image.

Furthermore, when there is a large size difference between some teeth in scan data of the first tooth image according to an embodiment and corresponding teeth in the tooth model data, roots of the teeth are not formed naturally. Therefore, according to an embodiment, the intraoral image processing apparatus 100 may scale the tooth model data to fit the scan data.

For example, when a difference between a size of the scan data (first tooth image) regarding the first tooth and a size of the tooth model data is greater than or equal to a preset value, the intraoral image processing apparatus 100 may scale the tooth model data regarding the first tooth so that the difference between the size of the scan data (first tooth image) regarding the first tooth and the size of the tooth model data is less than the preset value.

Figure 6:
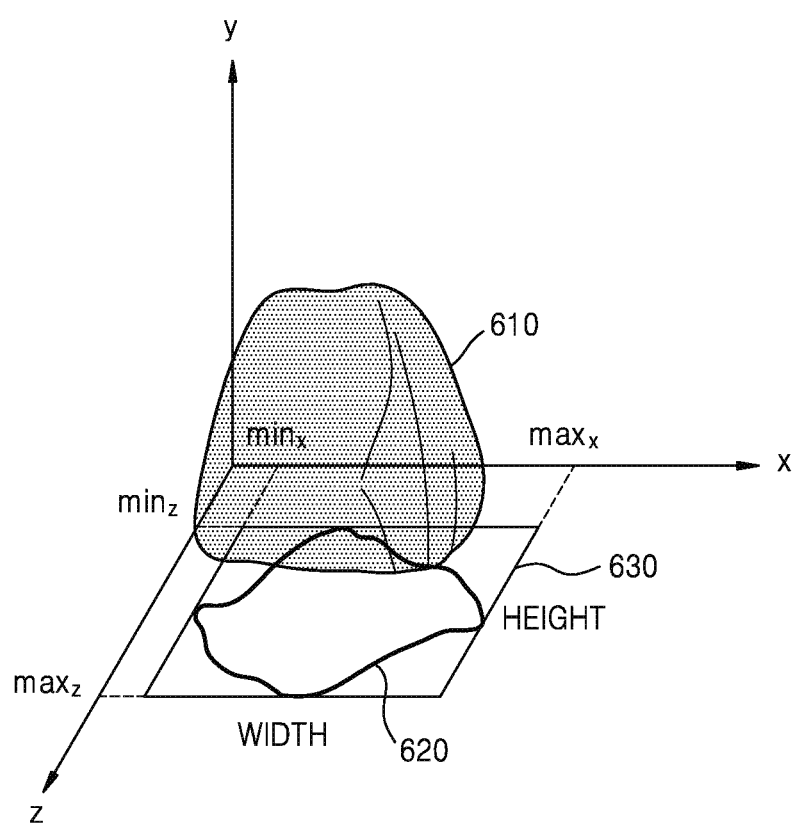

A method of measuring sizes of teeth in scan data and tooth model data is described with reference to FIG. 6. FIG. 6 is a reference diagram for describing a method of obtaining a size of a tooth, according to an embodiment.

For convenience of description, the method of FIG. 6 is described with reference to some tooth 610 (e.g. anterior tooth #21) included in the scan data (a first tooth image). Specifically, the tooth 610 in the scan data may be projected onto the z-x plane as shown in FIG. 6. A bounding box 630 may be set by using min and max values (minx and max.) for a projected tooth image 620 in an x-axis direction and min and max values (mint and maxi) in a z-axis direction. The intraoral image processing apparatus 100 may obtain a mean value of a width and a height of the bounding box 630.

In addition, the intraoral image processing apparatus 100 may obtain a mean value of a width and a height of a tooth (e.g., anterior tooth #21) in tooth model data in the same manner.

The intraoral image processing apparatus 100 may scale the tooth model data by using the obtained mean values of the widths and heights in the scan data and tooth model data.

In an embodiment, when the mean values of widths and heights of the teeth in the scan data and the tooth model data projected onto the z-x plane are 10 and 15, respectively, the intraoral image processing apparatus 100 may scale the tooth model data by 10/15 to reduce a difference from the size of the tooth in the scan data.

Through the above scaling, smooth surface blending between the first tooth image data and the tooth model data may be achieved.

Figure 7:
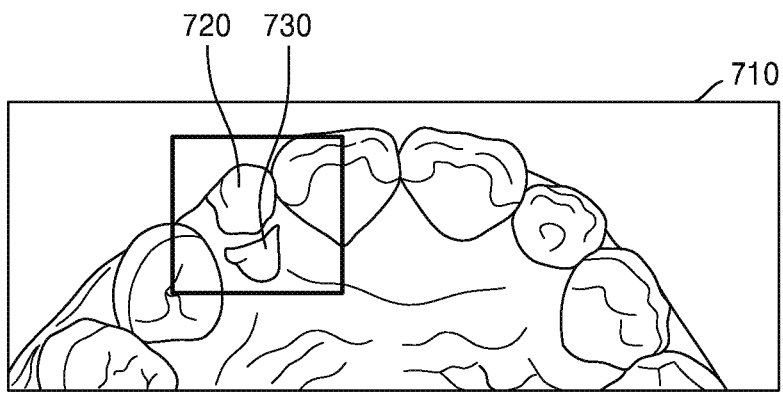

FIG. 7 is a diagram illustrating a synthetic image obtained when scaling is not performed, according to an embodiment.

A synthetic image 710 shown in FIG. 7 is a synthetic image obtained by synthesizing the first tooth image and tooth model data without performing scaling when a difference between a size of the scan data (the first tooth image) regarding a first tooth 720 and a size of the tooth model data is greater than or equal to a preset value.

When the scan data regarding the first tooth 720 and tooth model data regarding the first tooth 720 are synthesized, the size of the tooth model data regarding the first tooth 720 is greater than the size of the scan data regarding the first tooth 720 by the preset value or greater, and thus tooth model data 730 (a root) regarding the first tooth 720 may protrude more than a gingiva.

Therefore, according to an embodiment, the intraoral image processing apparatus 100 performs scaling to prevent the tooth model data from protruding more than the gingiva.

Figure 8:
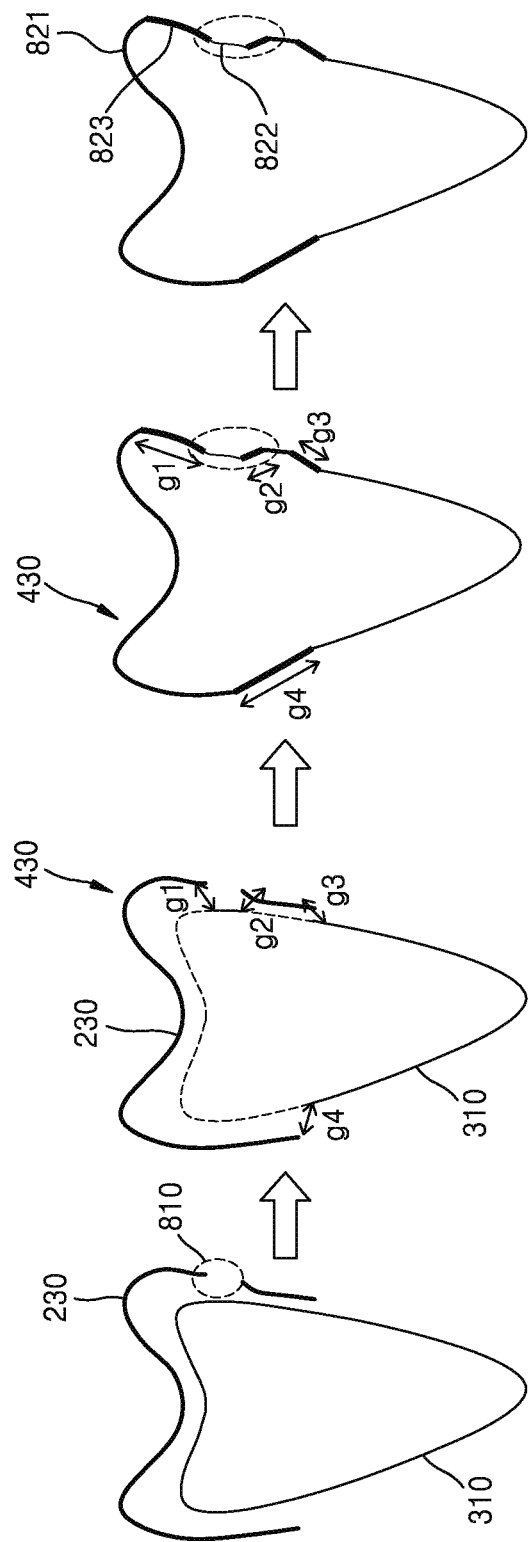

FIG. 8 is a reference diagram for describing a case where a gap occurs in the synthetic image 430 and surface blending for the gap.

Referring to FIG. 8, when scan data is not obtained from a portion of a tooth, a scan hole 810 occurs in the first tooth image 230, and as a result of synthesizing the first tooth image 230 and the tooth model data 310 by performing the ray intersection test shown and described with reference to FIG. 4, a first gap g1 and a second gap g2 occur in the synthetic image 430 due to the presence of the scan hole 810. In addition, a third gap g3 and a fourth gap g4 occur in the synthetic image 430 due to a boundary between the first tooth image 230 and the tooth model data 310.

Furthermore, according to an embodiment, the intraoral image processing apparatus 100 may delete at least one of a portion of data of the first tooth image and a portion of the tooth model data from boundary regions between the first tooth image 230 and the tooth model data 310, which are included in the synthetic image 430 (boundary shrinking). Because the boundary shrinking has been described in detail with reference to FIG. 5, a detailed description thereof will be omitted below. As the boundary shrinking operation is performed, sizes of the first to fourth gaps g1, g2, g3, and g4 may increase.

Furthermore, the intraoral image processing apparatus 100 may perform surface blending (mesh blending) on the synthetic image 430. The surface blending may refer to a technique for filling gaps included in the synthetic image 430, and the surface blending may be performed to generate surface data corresponding to the gaps. For example, as shown in FIG. 8, when the first gap g1 occurs between a first surface 821 and a second surface 822, the surface blending may mean creating a third surface 823 that smoothly connects the first surface 821 and the second surface 822 in order to fill the first gap g1. Various surface blending techniques may be used to create the third surface 823. For example, the intraoral image processing apparatus 100 may generate blending patches that smoothly connect a portion of first mesh data constituting the first surface 821 (hereinafter referred to as first patches) and a portion of second mesh data (second patches) constituting the second surface 822, and the third surface 823 may be constituted by the blending patches.

Furthermore, the intraoral image processing apparatus 100 may perform surface blending for the remaining gaps g2, g3, and g4 included in the synthetic image 430 in the same manner as for the first gap g1.

In addition, the intraoral image processing apparatus 100 may selectively adjust a mesh density after performing surface blending. In detail, scan data and template data may have different mesh densities, and the mesh density is related to a resolution.

When the intraoral image processing apparatus 100 performs the surface blending described with reference to FIG. 8, the mesh density of the first tooth image 230 (scan data) is changed, resulting in a decrease in sharpness (resolution) compared to initial scan data obtained by the scanner. Therefore, the intraoral image processing apparatus 100 may adjust a change in the mesh density so that the sharpness of the scan data does not deteriorate below a preset value.

Figure 9:
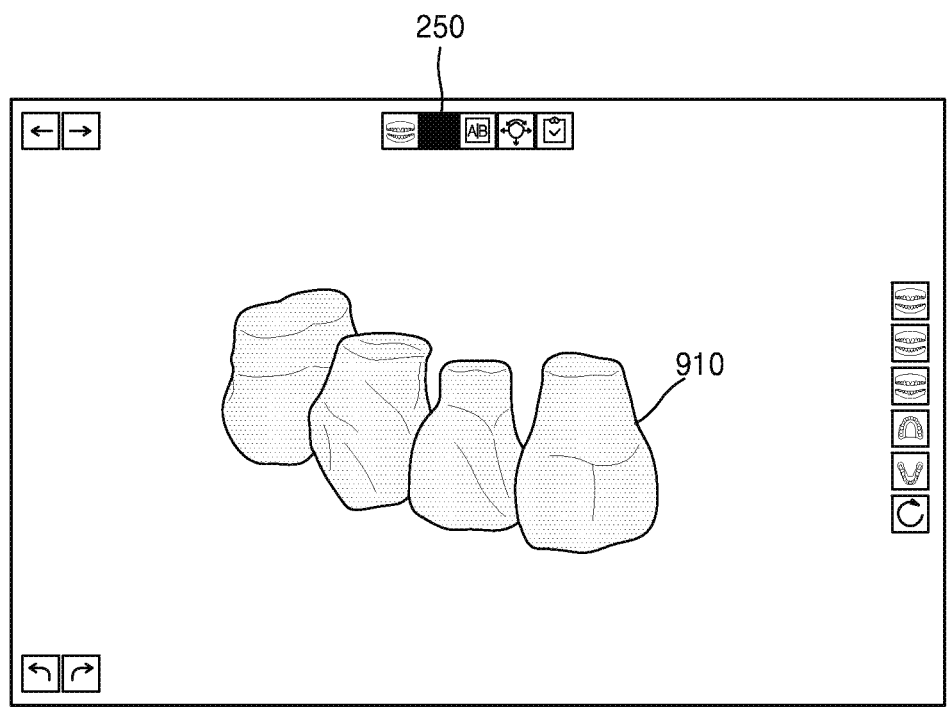
FIG. 9 is a diagram illustrating an interface screen on which a second tooth image is displayed, according to an embodiment.

FIG. 9 is a diagram illustrating an interface screen on which a second tooth image is displayed, according to an embodiment.

As described with reference to FIG. 8, according to an embodiment, the intraoral image processing apparatus 100 may display a second tooth image 910 obtained by performing surface blending on the synthetic image.

According to an embodiment, a tooth included in the second tooth image 910 is a closed tooth including a tooth root. In this case, a color of the second tooth image 910 may be determined based on a color of the first tooth image 230. For example, the intraoral image processing apparatus 100 may determine a color value of tooth model data or surface data generated by performing surface blending, which is included in second tooth image 910, based on a mean value of color values (e.g., pixel values) of intraoral data included in the first tooth image 230. However, the disclosure is not limited thereto.

Moreover, according to an embodiment, the intraoral image processing apparatus 100 may visually output the second tooth image 910 onto the user interface screen. For example, as shown in FIG. 2, the intraoral image processing apparatus 100 may display, on the user interface screen, both the first tooth image 230 and a menu 250 for obtaining a second tooth image. When receiving a user input for selecting the menu 250 for obtaining a second tooth image, the intraoral image processing apparatus 100 may generate the second tooth image 910 based on the operations described with reference to FIGS. 3 to 7, and display the generated second tooth image 910 on the user interface screen.

Moreover, when an error occurs in the second tooth image 910, the user may manually select a tooth region of a tooth where the error occurs. The intraoral image processing apparatus 100 may generate a second tooth image in which the error is corrected by repeating the process described with reference to FIGS. 3 to 9 by using tooth model data and scan data of the selected tooth region.

Figure 10:
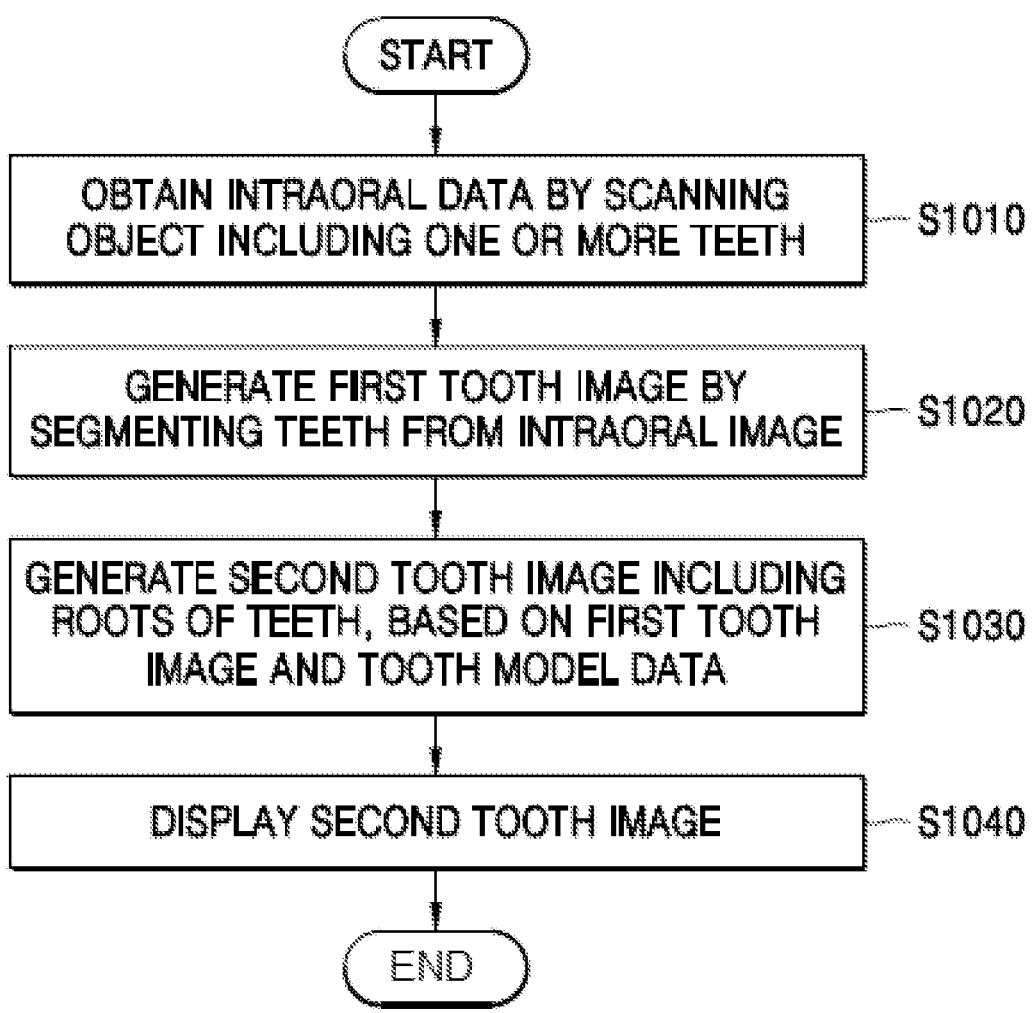
FIG. 10 is a flowchart of an intraoral image processing method according to an embodiment.

FIG. 10 is a flowchart of an intraoral image processing method according to an embodiment.

Referring to FIG. 10, according to an embodiment, the intraoral image processing apparatus 100 may obtain intraoral data (S1010).

3D intraoral data may be obtained by scanning at least one tooth with the intraoral scanner 10. Alternatively, the intraoral data may be obtained by scanning a plaster model, an impression model, etc. with a dental table scanner. In this case, the at least one tooth and gingiva adjacent to the tooth may be scanned together.

According to an embodiment, the 3D intraoral data may be mesh data, and it may be data representing information about a surface of an object.

In addition, the intraoral image processing apparatus 100 may generate an intraoral image based on intraoral data.

According to an embodiment, the intraoral image processing apparatus 100 may generate a first tooth image by segmenting teeth from an intraoral image (S1020).

The intraoral image processing apparatus 100 may segment a tooth region and a gingival region in the intraoral image, and segmenting the tooth region and the gingival region in the intraoral image may mean separating teeth included in the intraoral image from the gingival region. Accordingly, a first tooth image including only teeth may be generated. In this case, the first tooth image may include teeth without tooth roots.

According to an embodiment, the intraoral image processing apparatus 100 may generate a second tooth image including roots of the teeth, based on the first tooth image and tooth model data (S1030).

Because the process of generating the second tooth image is the same as described above, descriptions already provided above will be omitted below.

Subsequently, the intraoral image processing apparatus 100 may display the generated second tooth image (S1040).

Figure 11:
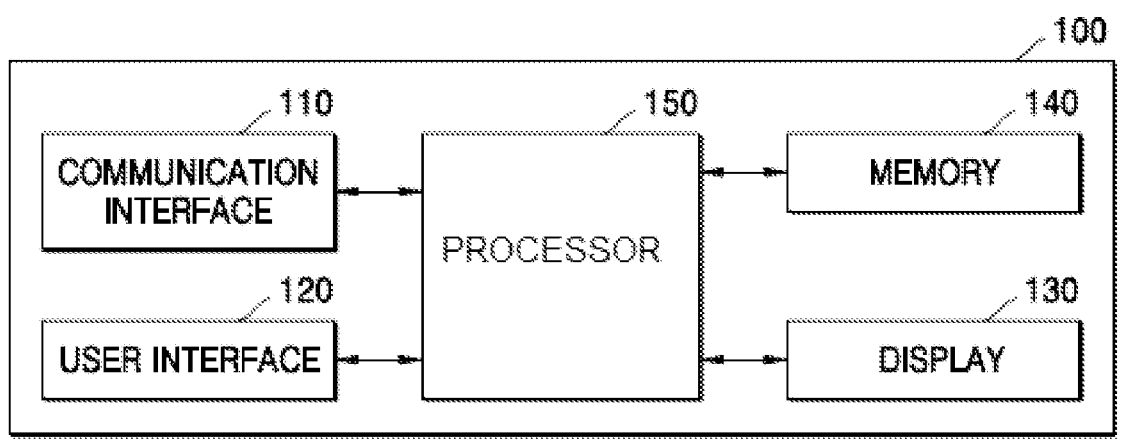
FIG. 11 is a block diagram of an intraoral image processing apparatus according to an embodiment.

FIG. 11 is a block diagram of an intraoral image processing apparatus according to an embodiment.

The intraoral image processing method shown in FIG. 10 may be performed by the intraoral image processing apparatus 100. Therefore, the flowchart of the intraoral image processing method shown in FIG. 10 may be a flowchart showing operations of the intraoral image processing apparatus 100.

Referring to FIG. 11, the intraoral image processing apparatus 100 may include a communication interface 110, a user interface 120, a display 130, a memory 140, and a processor 150.

The communication interface 110 may perform communication with at least one external electronic device (e.g., the intraoral scanner 10, a server, an external medical device, or the like) via a wired or wireless communication network.

The communication interface 110 may perform communication with the at least one external electronic device according to control by the processor 150.

In detail, the communication interface 110 may include at least one short-range communication module that performs communication according to a communication standard such as Bluetooth, Wi-Fi, Bluetooth Low Energy (BLE), near field communication (NFC)/radio frequency identification (RFID), Wi-Fi Direct, ultra-wideband (UWB), ZigBee, or the like.

In addition, the communication interface 110 may further include a long-range communication module that communicates with a server for supporting long-range communication according to long-range communication standards. Specifically, the communication interface 110 may include a long-range communication module that performs communication via a network for Internet communication. Furthermore, the communication interface 110 may include a long-range communication module that performs communication via a communication network conforming to communication standards such as third generation (3G), fourth generation (4G), and/or fifth generation (5G).

In addition, the communication interface 110 may include at least one port for connecting to an external electronic device (e.g., an intraoral scanner, etc.) via a wired cable in order to communicate with the external electronic device in a wired manner. Accordingly, the communication interface 110 may perform communication with the external electronic device connected thereto in a wired manner through the at least one port.

The user interface 120 may receive a user input for controlling the intraoral image processing apparatus 100. The user interface 120 may include a user input device including a touch panel for sensing a user's touch, a button for receiving a user's push manipulation, a mouse or a keyboard for specifying or selecting a point on a user interface screen, etc., but is not limited thereto.

In addition, the user interface 120 may include a voice recognition device for performing voice recognition. For example, the voice recognition device may be a microphone, and receive a user's voice command or voice request. Accordingly, the processor 150 may control an operation corresponding to the voice command or voice request to be performed.

The display 130 displays a screen. Specifically, the display 130 may display a certain screen according to control by the processor 150. In detail, the display 130 may display a user interface screen including an intraoral image generated based on data obtained by scanning a patient's oral cavity with the intraoral scanner 10. Alternatively, the display 130 may display a user interface screen including information related to a patient's dental treatment.

The memory 140 may store at least one instruction. Furthermore, the memory 140 may store at least one instruction executed by the processor 150. Furthermore, the memory 140 may store at least one program executed by the processor 150. In addition, the memory 140 may store data received from the intraoral scanner 10 (e.g., raw data obtained through intraoral scanning, etc.). Alternatively, the memory 140 may store an intraoral image representing an oral cavity in 3D.

The processor 150 controls an intended operation to be performed by executing at least one instruction stored in the memory 140. In this case, the at least one instruction may be stored in an internal memory included in the processor 150 or the memory 140 included in the intraoral image processing apparatus separately from the processor.

In detail, the processor 150 may execute at least one instruction to control at least one component included in the intraoral image processing apparatus such that an intended operation is performed. Thus, even when it is described that the processor performs certain operations, it may be understood that the processor controls at least one component included in the intraoral image processing apparatus such that the certain operations are performed.

According to an embodiment, the processor 150 may execute at least one instruction stored in the memory 140 to obtain 3D intraoral data based on 2D image data obtained by scanning at least one tooth. According to an embodiment, the 3D intraoral data may be mesh data. When at least one tooth is scanned, not only the at least one tooth but also the gingiva adjacent to the tooth may be scanned.

The processor 150 may execute at least one instruction stored in the memory 140 to generate an intraoral image based on intraoral data and generate a first tooth image by segmenting teeth from the intraoral image. In this case, the first tooth image may include teeth without tooth roots.

The processor 150 may execute at least one instruction stored in the memory 140 to generate, based on the first tooth image and tooth model data, a second tooth image including roots of the teeth. The tooth model data may be data prestored in the memory 140 or obtained from an external device via the communication interface 110.

The processor 150 may execute at least one instruction stored in the memory 140 to align the first tooth image with the tooth model data. For example, the processor 150 may align the first tooth image with the tooth model data by using various alignment algorithms, based on shape information on teeth included in the first tooth image and shape information on teeth included in the tooth model data.

The processor 150 may execute at least one instruction stored in the memory 140 to perform a ray intersection test and synthesize the first tooth image and the tooth model data aligned with each other to thereby generate a synthetic image. Because this has been described in detail with reference to FIG. 4, a detailed description thereof will be omitted herein.

The processor 150 may execute one or more instructions stored in the memory 140 to perform boundary shrinking on a boundary region included in the synthetic image and perform surface blending for a gap that occurs as a result thereof, thereby generating a second tooth image. Because a method of performing boundary shrinking and surface blending has been described in detail with reference to FIGS. 5 and 6, a detailed description thereof will be omitted below.

The processor 150 may execute one or more instructions stored in the memory 140 to determine a color of the second tooth image based on a color of the first tooth image and control the display 130 to output the second tooth image onto a screen.

According to an embodiment, the processor 150 may be implemented in a form that internally includes at least one internal processor and a memory device (e.g., random access memory (RAM), read-only memory (ROM), etc.) for storing at least one of programs, instructions, signals, and data to be processed or used by the internal processor.

Furthermore, the processor 150 may include a graphics processing unit (GPU) for processing graphics corresponding to a video. Furthermore, the processor may be implemented as a system on chip (SOC) that integrates a core with the GPU. In addition, the processor may include more than a single core, i.e., multiple cores. For example, the processor may include dual-core, triple-core, quad-core, hexa-core, octa-core, deca-core, dodeca-core, hexadeca-core, etc.

In an embodiment of the disclosure, the processor 150 may generate an intraoral image based on a 2D image received from the intraoral scanner 10.

Specifically, according to control by the processor 150, the communication interface 110 may receive data obtained by the intraoral scanner 10, e.g., raw data obtained through intraoral scanning. Also, the processor 150 may generate a 3D intraoral image representing the oral cavity in 3D, based on the raw data received via the communication interface 110. For example, the intraoral scanner 10 may include at least one camera to reconstruct a 3D image according to an optical triangulation method, and more particularly, include a left camera L corresponding to a left field of view and a right camera R corresponding to a right field of view. In addition, the intraoral scanner may respectively obtain left image data corresponding to the left field of view and right image data corresponding to the right field of view from the left camera L and the right camera R. Subsequently, the intraoral scanner may transmit raw data including the left image data and the right image data to the communication interface 110 of the intraoral image processing apparatus 100.

The communication interface 110 may then transmit the received raw data to the processor 150, and the processor 150 may generate, based on the received raw data, an intraoral image representing the oral cavity in 3D.

Furthermore, the processor 150 may control the communication interface 110 to receive an intraoral image representing the oral cavity in 3D directly from an external server, a medical device, or the like. In this case, the processor may obtain a 3D intraoral image without generating a 3D intraoral image based on the raw data.

According to the embodiment of the disclosure, when the processor 150 performs operations such as 'extraction', 'obtaining', and 'generation', this may include not only a case where the processor 150 directly performs the above-described operations by executing at least one instruction but also a case where the processor 150 controls other components so that the operations are performed.

In order to implement the embodiments presented in the present disclosure, the intraoral image processing apparatus 100 may include only some of the components shown in FIG. 11 or include more components than those shown in FIG. 11.

Furthermore, the intraoral image processing apparatus 100 may store and execute dedicated software linked to the intraoral scanner. Here, the dedicated software may be referred to as a dedicated program, a dedicated tool, or a dedicated application. When the intraoral image processing apparatus 100 operates in conjunction with the intraoral scanner 10, the dedicated software stored in the intraoral image processing apparatus 100 connected to the intraoral scanner 10 to receive in real time data obtained through intraoral scanning. For example, Medit's i500 intraoral scanner is equipped with dedicated software for processing data obtained through intraoral scanning. Specifically, Medit has produced and distributed 'Medit Link' which is software for processing, managing, using, and/or transmitting data obtained from its intraoral scanner (e.g., the i500 intraoral scanner). Here, because 'dedicated software' means programs, tools, or applications that work in conjunction with an intraoral scanner, various intraoral scanners developed and sold by various manufacturers may also share and use the dedicated software. In addition, the dedicated software may be produced and distributed separately from an intraoral scanner for performing intraoral scanning.

The intraoral image processing apparatus 100 may store and execute the dedicated software corresponding to the i500 product. The dedicated software may perform at least one operation for obtaining, processing, storing, and/or transmitting an intraoral image. Here, the dedicated software may be stored in the processor. In addition, the dedicated software may provide a user interface for use of data obtained from an intraoral scanner. In this case, a user interface screen provided by the dedicated software may include an intraoral image generated according to an embodiment of the disclosure.

An intraoral image processing method according to an embodiment of the present disclosure may be implemented in the form of program commands executable by various types of computers and recorded on computer-readable recording media. Furthermore, according to an embodiment of the present disclosure, computer-readable storage media having recorded thereon one or more programs including at least one instruction for executing the intraoral image processing method may be provided.

The computer-readable storage media may include program commands, data files, data structures, etc. either alone or in combination. Examples of the computer-readable storage media include magnetic media such as hard disks, floppy disks, and magnetic tapes, optical media such as compact disk ROM (CD-ROM) and digital versatile disks (DVDs), magneto-optical media such as floptical disks, and hardware devices that are specially configured to store and perform program commands, such as ROM, RAM, flash memory, etc.

Here, the computer-readable storage media may be provided in the form of non-transitory storage media. In this regard, the term 'non-transitory storage media' may mean that the storage media are a tangible device. Furthermore, the 'non-transitory storage media' may include a buffer for temporarily storing data.

According to an embodiment, intraoral image processing methods according to various embodiments of the present disclosure may be included in a computer program product when provided. The computer program product may be distributed in the form of a computer-readable storage medium (e.g., CD-ROM). Alternatively, the computer program product may be distributed (e.g., downloaded or uploaded) on-line via an application store (e.g., Google™ Play Store™, etc.) or directly between two user devices (e.g., smartphones). Specifically, the computer program product according to the disclosed embodiment may include a storage medium having recorded thereon a program including at least one instruction for performing the intraoral image processing method according to the disclosed embodiment.

While embodiments have been particularly described above, the embodiments are not to be construed as limiting the scope of the present disclosure, and various modifications and improvements made by those of ordinary skill in the art based on a basic concept of the present disclosure also fall within the scope of the present disclosure as defined by the following claims.

The invention claimed is:

1. An intraoral image processing method comprising:
   obtaining an intraoral image by scanning an object including one or more teeth;
   generating a first tooth image from the intraoral image;
   determining a first tooth model data among from a plurality of pieces of tooth model data including template model data in which teeth are arranged, based on at least one of shape information on teeth included in the first tooth image, shape information on a dental arch included in the first tooth image, or size information on the teeth included in the first tooth image;

generating a synthetic image obtained by synthesizing the first tooth model data and the first tooth image by performing a synthesis test of determining whether data of the first tooth image corresponding to a first vertex included in the first tooth model data exists;

generating a second tooth image including roots of the teeth based on the synthetic image; and displaying the second tooth image, wherein the generating of the synthetic image comprises:

when the data of the first tooth image corresponding to the first vertex exists, determining data of the first tooth image corresponding to the first vertex as data of the synthetic image, and when the data of the first tooth image corresponding to the first vertex does not exist, determining the first vertex as data of the synthetic image.

2. The intraoral image processing method of claim 1, wherein the generating of the first tooth image comprises segmenting a tooth region and a gingival region from the intraoral image.

3. The intraoral image processing method of claim 2, wherein the generating of the first tooth image further comprises segmenting the teeth included in the tooth region.

4. The intraoral image processing method of claim 1, wherein the generating of the synthetic image comprises:
aligning the first tooth image with the first tooth model data; and
synthesizing the first tooth image and the aligned first tooth model data.

5. The intraoral image processing method of claim 4, wherein the aligning of the first tooth image with the first tooth model data comprises aligning the teeth included in the first tooth image with teeth included in the first tooth model data, based on the shape information on the teeth included in the first tooth image and shape information on the teeth included in the first tooth model data.

6. The intraoral image processing method of claim 1, wherein the synthesis test is a nearest neighbor test or a ray intersection test.

7. The intraoral image processing method of claim 6, wherein
when the synthesis test is the nearest neighbor test,
the generating of the synthetic image comprises
finding a vertex in the first tooth image which is closest to a vertex in the first tooth model data,
when a distance between the first vertex in the tooth model data and the vertex in the first tooth image which is closest to the first vertex in the first tooth model data is less than or equal to a threshold distance, determining data of the first tooth image as data of the synthetic image, and
when the distance between the first vertex in the first tooth model data and the vertex in the first tooth image which is closest to the first vertex in the first tooth model data is greater than the threshold distance, determining the first vertex in the first tooth model data as data of the synthetic image.

8. The intraoral image processing method of claim 6, wherein
when the synthesis test is the ray intersection test,
the generating of the synthetic image comprises
testing whether a virtual ray intersects the first tooth image, wherein the virtual ray is generated at the first vertex among a plurality of vertices included in the first tooth model data and has a direction parallel to a normal vector at the first vertex,
when the virtual ray intersects the first tooth image, determining data of the first tooth image at a point of the intersection as data of the synthetic image, and
when the virtual ray does not intersect the first tooth image, determining data for the first vertex as data of the synthetic image.

9. The intraoral image processing method of claim 1, further comprising deleting at least one of a portion of the first tooth image and a portion of the first tooth model data from a boundary region between the first tooth image and the first tooth model data, which is included in the synthetic image.

10. The intraoral image processing method of claim 1, further comprising scaling the first tooth model data included in the synthetic image.

11. The intraoral image processing method of claim 1, further comprising performing surface blending for a gap region included in the synthetic image.

12. The intraoral image processing method of claim 1, wherein
the second tooth image includes a crown and a root of the one or more teeth, and
the generating of the second tooth image comprises
generating an image of the crown based on intraoral data obtained through the scanning and generating an image of the root based on the first tooth model data.

13. An intraoral image processing apparatus comprising:
a display;
a memory storing one or more instructions; and
a processor configured to execute the one or more instructions stored in the memory to:
obtain an intraoral image by scanning an object including one or more teeth,
generate a first tooth image from the intraoral image,
determine a first tooth model data among from a plurality of pieces of tooth model data including template model data in which teeth are arranged, based on at least one of shape information on teeth included in the first tooth image, shape information on a dental arch included in the first tooth image, or size information on the teeth included in the first tooth image,
generate a synthetic image obtained by synthesizing the first tooth model data and the first tooth image by performing a synthesis test of determining whether data of the first tooth image corresponding to a first vertex included in the first tooth model data exists,
generate a second tooth image including roots of the teeth based on the synthetic image, and
control the display to display the second tooth image,
wherein the processor is further configured to execute the one or more instructions stored in the memory to:
when the data of the first tooth image corresponding to the first vertex exists, determine data of the first tooth image corresponding to the first vertex as data of the synthetic image, and when the data of the first tooth image corresponding to the first vertex does not exist, determine the first vertex as data of the synthetic image.

14. The intraoral image processing apparatus of claim 13, wherein
the processor is further configured to execute the one or more instructions stored in the memory to align the first tooth image with the first tooth model data and synthesize the first tooth image and the aligned first tooth model data.

15. The intraoral image processing apparatus of claim 13, wherein the synthesis test is a nearest neighbor test or a ray intersection test.

16. The intraoral image processing apparatus of claim 15, wherein the processor is further configured to execute the one or more instructions stored in the memory to test whether a virtual ray intersects the first tooth image, wherein the virtual ray is generated at the first vertex among a plurality of vertices included in the first tooth model data and has a direction parallel to a normal vector at the first vertex, when the virtual ray intersects the first tooth image, determine data of the first tooth image at a point of the intersection as data of the synthetic image, and when the virtual ray does not intersect the first tooth image, determine data for the first vertex as data of the synthetic image.

17. The intraoral image processing apparatus of claim 13, wherein the second tooth image includes a crown and a root of the one or more teeth, and the processor is further configured to execute the one or more instructions stored in the memory to generate an image of the crown based on intraoral data obtained through the scanning and generate an image of the root based on the first tooth model data.

18. A non-transitory computer-readable recording medium having recorded thereon a program including at least one instruction for performing, by a computer, an intraoral image processing method comprising:

obtaining an intraoral image by scanning an object including one or more teeth;

generating a first tooth image from the intraoral image;

determining a first tooth model data among from a plurality of pieces of tooth model data including template model data in which teeth are arranged, based on at least one of shape information on teeth included in the first tooth image, shape information on a dental arch included in the first tooth image, or size information on the teeth included in the first tooth image;

generating a synthetic image obtained by synthesizing the first tooth model data and the first tooth image by performing a synthesis test of determining whether data of the first tooth image corresponding to a first vertex included in the first tooth model data exists;

generating a second tooth image including roots of the teeth based on the synthetic image; and displaying the second tooth image, wherein the generating of the synthetic image comprises:

when the data of the first tooth image corresponding to the first vertex exists, determining data of the first tooth image corresponding to the first vertex as data of the synthetic image, and when the data of the first tooth image corresponding to the first vertex does not exist, determining the first vertex as data of the synthetic image.

* * * * *